US011955751B2

(12) United States Patent
Nishijima

(10) Patent No.: US 11,955,751 B2
(45) Date of Patent: Apr. 9, 2024

(54) CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Seido Nishijima, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 347 days.

(21) Appl. No.: 17/606,709

(22) PCT Filed: Apr. 23, 2020

(86) PCT No.: PCT/JP2020/017554

§ 371 (c)(1),
(2) Date: Oct. 26, 2021

(87) PCT Pub. No.: WO2020/230583

PCT Pub. Date: Nov. 19, 2020

(65) Prior Publication Data

US 2022/0216651 A1 Jul. 7, 2022

(30) Foreign Application Priority Data

May 13, 2019 (JP) ................................ 2019-090785

(51) Int. Cl.
*H01R 13/658* (2011.01)
*H01R 13/502* (2006.01)
(Continued)

(52) U.S. Cl.
CPC ....... *H01R 13/6582* (2013.01); *H01R 13/502* (2013.01); *H01R 13/652* (2013.01); *H01R 13/6592* (2013.01)

(58) Field of Classification Search
CPC .............. H01R 13/6582; H01R 13/502; H01R 13/652; H01R 13/6592
(Continued)

(56) References Cited

U.S. PATENT DOCUMENTS 5,632,634 A 5/1997 Soes
5,997,349 A 12/1999 Yoshioka
(Continued)

FOREIGN PATENT DOCUMENTS

JP 2002238142 A * 8/2002 ......... H01R 13/5205
JP 2002324627 A * 11/2002 ......... H01R 13/5208
(Continued)

OTHER PUBLICATIONS

International Search Report dated Jul. 14, 2020 for WO 2020/230583 A1 (4 pages).

*Primary Examiner* — Peter G Leigh
(74) *Attorney, Agent, or Firm* — Venjuris, P.C.

(57) ABSTRACT

The present disclosure provides a connector enabling a size reduction by simplifying a configuration. A connector 11 includes a housing 21 in which a plurality of shielded cables 14 are held while being partially inserted, and cores of the plurality of shielded cables 14 are connected to a plurality of terminals 13*a* of a mating connector 13 by connecting the housing 21 to the mating connector 13. The connector 11 includes an electromagnetic shielding shell 22 for covering the outer surface of the housing 21 and a shield terminal 27 to be provided between the plurality of shielded cables 14 in the housing 21, connected to shield members of the plurality of shielded cables 14 and connected to a ground terminal 13*b* of the mating connector 13 by connecting the housing 21 to the mating connector 13.

5 Claims, 6 Drawing Sheets

(51) Int. Cl.
*H01R 13/652* (2006.01)
*H01R 13/6582* (2011.01)
*H01R 13/6592* (2011.01)

(58) Field of Classification Search
USPC .................................................... 439/607.01
See application file for complete search history.

(56) References Cited

U.S. PATENT DOCUMENTS

| | | | | |
|---|---|---|---|---|
| 6,815,610 | B2 * | 11/2004 | Kuboshima | H01R 13/6593 439/98 |
| 9,985,364 | B2 | 5/2018 | Masuda et al. | |
| 10,256,574 | B2 * | 4/2019 | Nishida | H01R 13/506 |
| 2002/0048994 | A1 * | 4/2002 | Oota | H01R 9/24 439/98 |
| 2002/0134565 | A1 * | 9/2002 | Hashizawa | H01R 13/6592 174/370 |
| 2002/0157843 | A1 * | 10/2002 | Fukushima | H01R 13/65912 174/391 |
| 2004/0132341 | A1 | 7/2004 | Noguchi et al. | |
| 2014/0120767 | A1 | 5/2014 | Itsuki et al. | |
| 2016/0028192 | A1 | 1/2016 | Wang et al. | |

FOREIGN PATENT DOCUMENTS

| | | | | | |
|---|---|---|---|---|---|
| JP | 2004079377 | A | * | 3/2004 | H01R 13/65912 |
| JP | 3802742 | B2 | * | 7/2006 | H01R 13/6592 |
| JP | 3832809 | B2 | * | 10/2006 | |
| JP | 3877139 | B2 | * | 2/2007 | |
| JP | 6260829 | B2 | * | 1/2018 | |
| WO | WO-2018186338 | A1 | * | 10/2018 | H01R 13/6581 |

* cited by examiner

CONNECTOR

CROSS REFERENCE TO RELATED APPLICATIONS

This application is a national phase of PCT application No. PCT/JP2020/017554, filed on 23 Apr. 2020, which claims priority from Japanese patent application No. 2019-090785, filed on 13 May 2019, all of which are incorporated herein by reference.

TECHNICAL FIELD

The present disclosure relates to a connector.

BACKGROUND

Conventionally, some connectors include a housing in which a shielded cable is held while being partially inserted, and are configured such that a core of the shielded cable is electrically connected to a terminal of a mating connector by connecting the housing to a mating connector (see, for example, Patent Document 1). In this connector, the housing has a two-layer structure including an inner housing and an outer housing, in particular, a multi-layer structure in which a shield shell is arranged outside the inner housing and the outer housing is further arranged outside the shield shell, and the radiation of electromagnetic waves (noise) from the connector is suppressed by the shield shell.

PRIOR ART DOCUMENT

Patent Document

Patent Document 1: JP 2018-055833 A

SUMMARY OF THE INVENTION

Problems to be Solved

However, the connector as described above had a problem of being complicated in configuration and enlarged by the multi-layer structure of the inner housing, the shield shell and the outer housing.

The present invention was developed to solve the above problem and aims to provide a connector enabling a size reduction by simplifying a configuration.

Means to Solve the Problem

The present disclosure is directed to a connector with a housing, shielded cables being held in the housing while being partially inserted, cores of the shielded cables being connected to terminals of a mating member by connecting the housing to the mating member, an electromagnetic shielding shell for covering an outer surface of the housing, and a shield terminal to be provided between the plurality of shielded cables in the housing, the shield terminal being connected to shield members of the shielded cables, the shield terminal being connected to a ground terminal of the mating member by connecting the housing to the mating member.

Effect of the Invention

According to the connector of the present disclosure, a configuration can be simplified and a size reduction can be realized.

DETAILED DESCRIPTION TO EXECUTE THE INVENTION

Description of Embodiments of Present Disclosure

Figure 1:
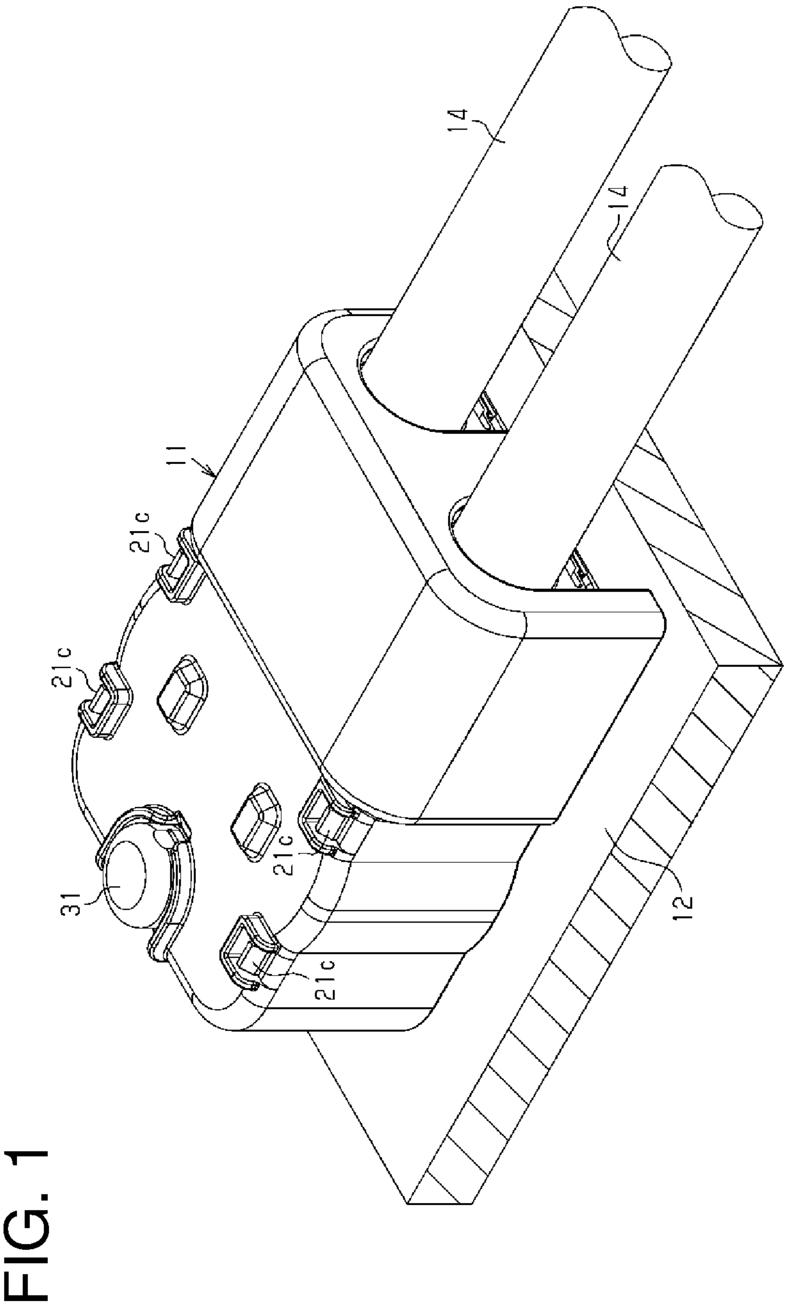
FIG. 1 is a perspective view of a connector and a mating member in one embodiment.

First, embodiments of the present disclosure are listed and described.

[1] The connector of the present disclosure includes a housing, a plurality of shielded cables being held in the housing while being partially inserted, cores of the plurality of shielded cables being connected to a plurality of terminals of a mating member by connecting the housing to the mating member, an electromagnetic shielding shell for covering an outer surface of the housing, and a shield terminal to be provided between the plurality of shielded cables in the housing, the shield terminal being connected to shield members of the plurality of shielded cables, the shield terminal being connected to a ground terminal of the mating member by connecting the housing to the mating member.

According to this configuration, since the electromagnetic shielding shell for covering the outer surface of the housing is provided, the radiation of electromagnetic waves from the connector can be suppressed. Further, since the shield terminal is provided which is connected to the shield members of the shielded cables and connected to the ground terminal of the mating member by connecting the housing to the mating member, the shield members of the shielded cables can be easily connected to the ground terminal to suppress the radiation of electromagnetic waves from the shielded cables. Such as due to the shield terminal provided between the plurality of shielded cables in the housing, a configuration can be simplified and a size reduction can be realized, for example, as compared to a multi-layer structure in which a shield shell is arranged outside an inner housing and an outer housing is further arranged outside the shield shell as before.

[2] Preferably, the electromagnetic shielding shell is set to electrically contact a conductive member of the mating member at three or more points.

According to this configuration, since the electromagnetic shielding shell is set to electrically contact the conductive member of the mating member at three or more points, the radiation of electromagnetic waves can be satisfactorily suppressed.

[3] Preferably, the electromagnetic shielding shell includes a grounding projection projecting to contact the conductive member.

According to this configuration, since the electromagnetic shielding shell includes the grounding projection projecting to contact the conductive member, the electromagnetic shielding shell can be brought into contact with the conductive member at an effective position while having a simple configuration. That is, the electromagnetic shielding shell may be lifted due to component accuracy or the like and may not contact at an effective position even if an attempt is made to bring the electromagnetic shielding shell into surface contact with the conductive member in a wide range. However, by avoiding this, the electromagnetic shielding shell can be brought into contact with the conductive member at the effective position.

[4] Preferably, the electromagnetic shielding shell is set to electrically contact the conductive member at least at three points by a pair of the grounding projections and a screw threadably engaged with the conductive member through the electromagnetic shielding shell.

According to this configuration, since the electromagnetic shielding shell is set to electrically contact the conductive member at least at three points by the pair of grounding projections and the screw threadably engaged with the conductive member through the electromagnetic shielding shell, the electromagnetic shielding shell can be stably fixed to the mating member by being electrically brought into contact with the conductive member at three effective points while having a simple configuration.

[5] Preferably, the shield terminal is made of a bent conductive plate material and includes a pair of parallel portions, a coupling portion coupling one ends of the pair of parallel portions and connecting portions respectively provided on the other ends of the pair of parallel portions to be connected to the shield members, and the ground terminal is inserted between the pair of parallel portions and connected to the pair of parallel portions when the housing is connected to the mating member.

According to this configuration, since being made of the bent conductive plate material, the shield terminal can be easily manufactured. Further, since the ground terminal is inserted between the pair of parallel portions and connected to the pair of parallel portions when the housing is connected to the mating member, the shield terminal and the ground terminal can be connected with high reliability, for example, as compared to the case where the shield terminal and the ground terminal are connected only by a contact piece configured to contact in a single direction.

Details of Embodiment of Present Disclosure

A specific example of a connector of the present disclosure is described below with reference to the drawings. Note that the present invention is not limited to these illustrations and is intended to be represented by claims and include all changes in the scope of claims and in the meaning and scope of equivalents.

As shown in FIG. 1, a connector 11 is, for example, fixed to a part of a casing 12 of an electrical device such as an inverter to be installed in a vehicle.

Figure 2:
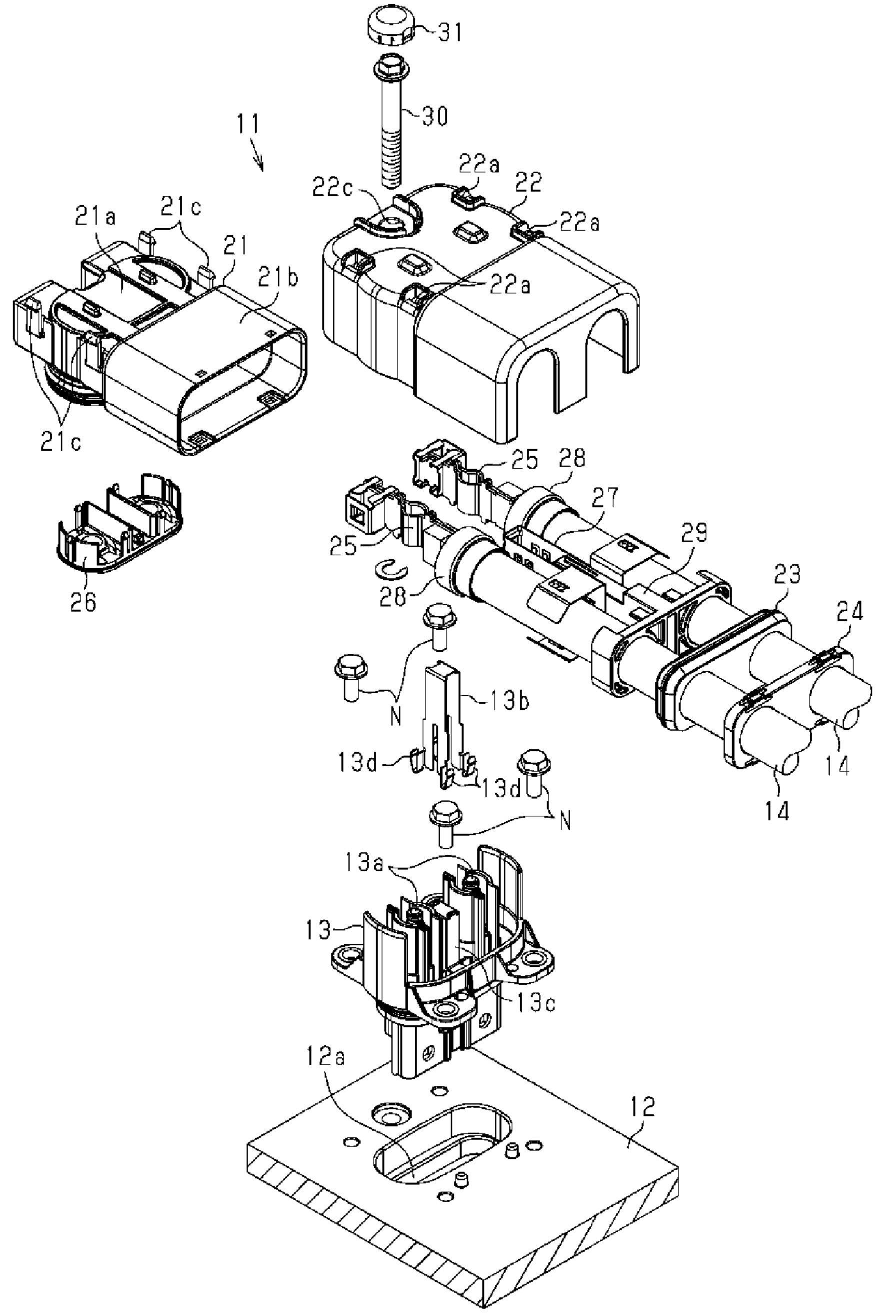
FIG. 2 is an exploded perspective view of the connector and the mating member in the one embodiment.
Figure 4:
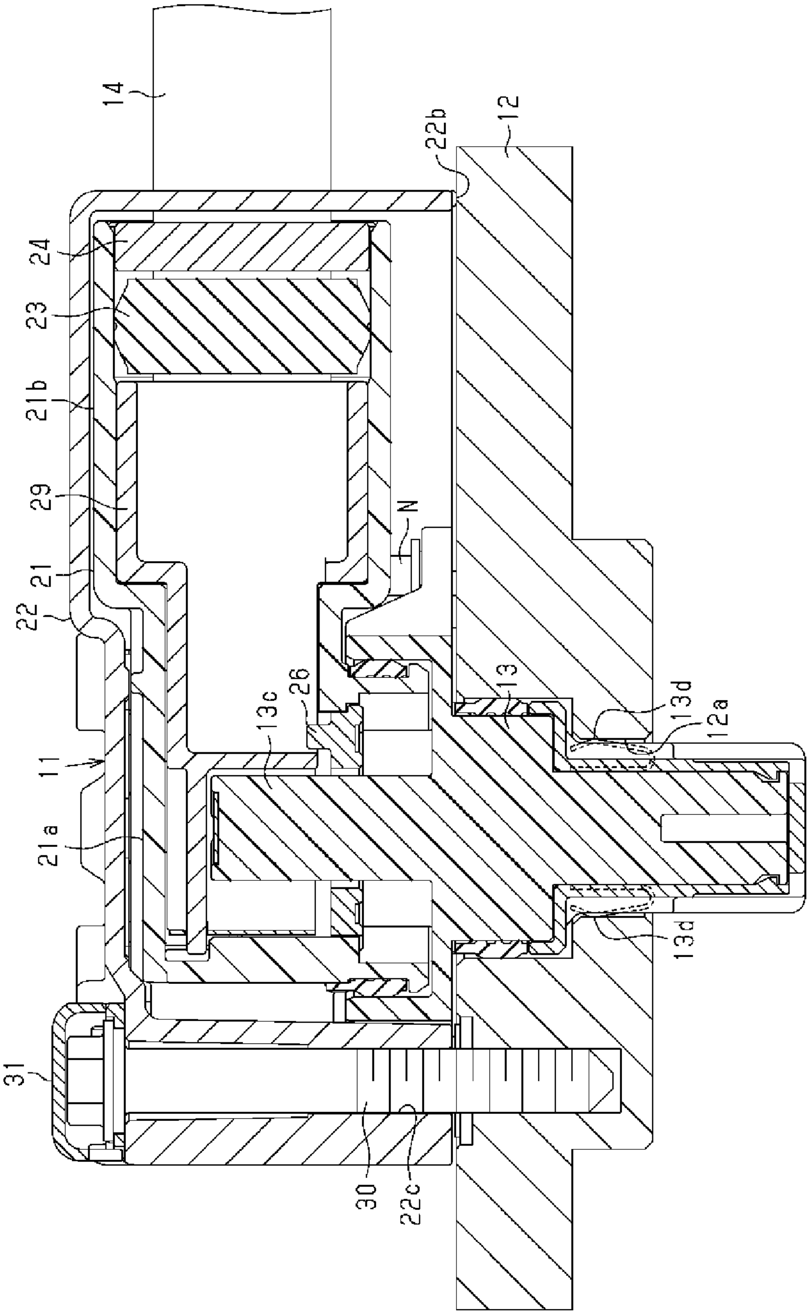
FIG. 4 is a section of the connector and the mating member in the one embodiment.
Figure 5:
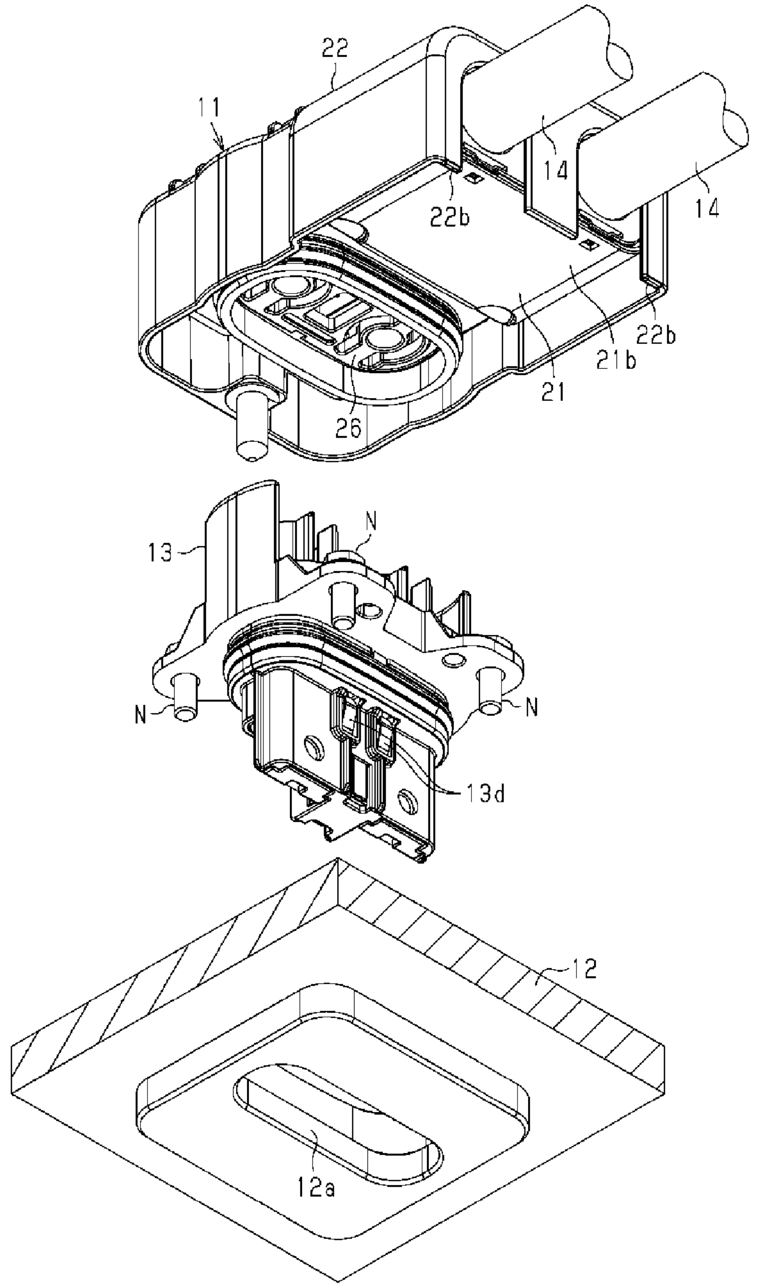
FIG. 5 is an exploded perspective view of the connector and the mating member in the one embodiment.

In particular, as shown in FIGS. 2, 4 and 5, the connector 11 is connected and fixed in a height direction to a mating connector 13 fixed to the casing 12 serving as a conductive member by screws N. The casing 12 is made of a metal material, and the mating connector 13 is made of a resin material. Note that, in this embodiment, the casing 12 and the mating connector 13 constitute a mating member. In a shown example, the height direction may be called a mounting direction of the connector 11 and the mating connector 13.

As shown in FIG. 2, the mating connector 13 is provided with a pair of terminals 13*a* projecting upward in the height direction. The terminals 13*a* are non-ground terminals and may be, for example, power terminals. Further, the mating connector 13 is provided with a ground terminal 13*b* projecting upward in the height direction between the pair of terminals 13*a*. The ground terminal 13*b* is made of a conductive plate material such as a bent metal plate. The mating connector 13 includes a support column 13*c* for supporting the ground terminal 13*b*. The support column 13*c* is, for example, arranged between the pair of terminals 13*a*. The ground terminal 13*b* is assembled to cover surfaces of the support column 13*c* facing the terminals 13*a*. The ground terminal 13*b* includes folded grounding pieces 13*d* in a lower end part. As shown in FIG. 4, the grounding pieces 13*d* are located in a fixing hole 12*a* of the casing 12 and pressed into contact with a hole surface of the fixing hole 12*a* with the mating connector 13 fixed to the casing 12.

Figure 3:
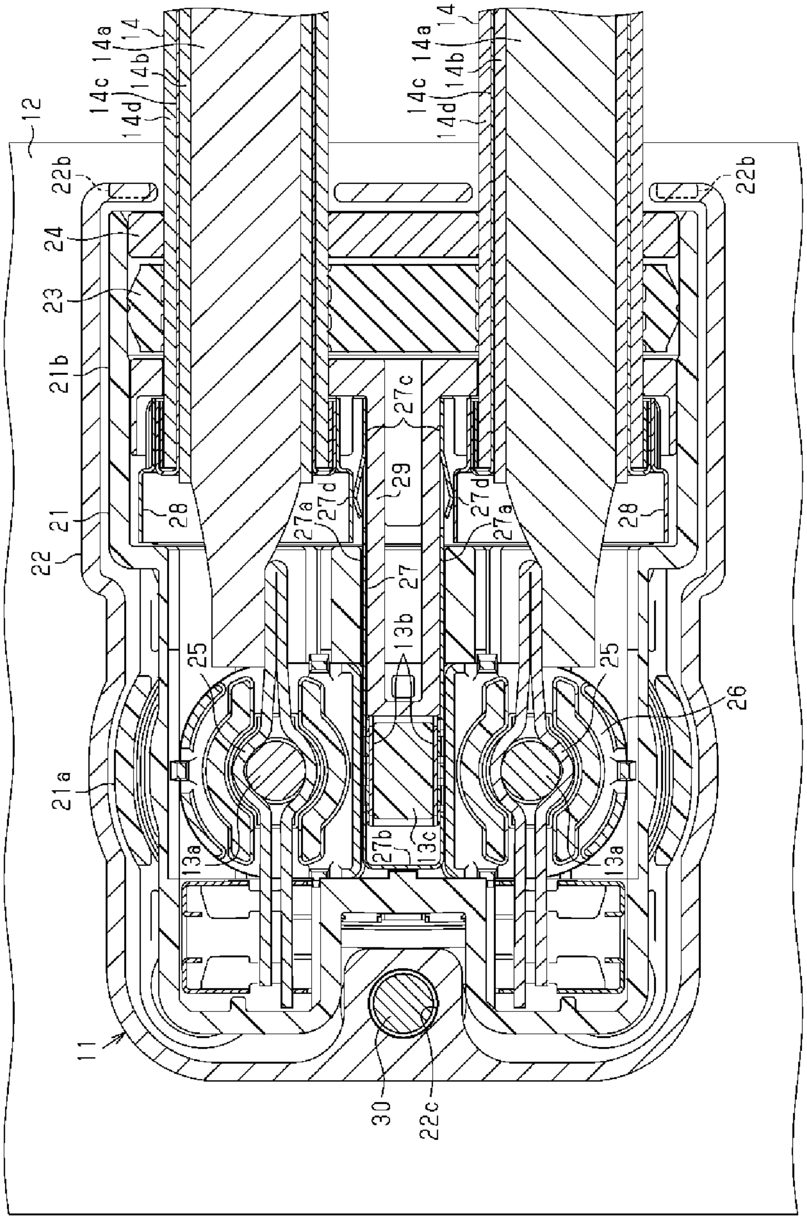
FIG. 3 is a section of the connector and the mating member in the one embodiment.

As shown in FIGS. 2 to 4, the connector 11 includes a housing 21 and an electromagnetic shielding shell 22 for covering the outer surface of the housing 21. A pair of shielded cables 14 are partially inserted into the housing 21 and held in the housing 21. The housing 21 is made of a resin material, and the electromagnetic shielding shell 22 is made of a metal material.

The housing 21 includes a body portion 21*a* having an opening in a lower part and a wire inserting portion 21*b* extending from the body portion 21*a* in a direction (wire draw-out direction) orthogonal to the height direction. The wire inserting portion 21*b* is substantially in the form of a rectangular tube and open in the direction (wire draw-out direction) orthogonal to the height direction, and tip parts of the pair of shielded cables 14 are held inserted therein. The wire inserting portion 21*b* is provided with a rubber seal 23 to be interposed between the inner surface of the wire inserting portion 21*b* and the outer surfaces of the shielded cables 14 and a retainer 24 for restricting the escape of the rubber seal 23 from the wire inserting portion 21*b* by being fixed to the wire inserting portion 21*b* while being interposed between the inner surface of the wire inserting portion 21*b* and the outer surfaces of the shielded cables 14.

The electromagnetic shielding shell 22 is shaped to cover the outer surface of the housing 21 except the lower surface of the housing 21 and parts corresponding to the shielded cables 14 to be inserted into the wire inserting portion 21*b*. The electromagnetic shielding shell 22 is assembled with and locked to the housing 21 from above. In particular, as shown in FIG. 2, the electromagnetic shielding shell 22 is locked to the housing 21 by locking claws 21*c* formed on the housing 21 being locked into locking holes 22*a* formed in the electromagnetic shielding shell 22.

As shown in FIG. 3, each shielded cable 14 includes a core 14*a* such as a conductive metal wire, an inner insulation coating 14*b* for covering the outer periphery of the core 14*a*, a shield member 14*c* for covering the outer periphery of the inner insulation coating 14*b* and an outer insulation coating 14*d* for covering the outer periphery of the shield member 14*c*. The shield member 14*c* is, for example, a braided wire formed by braiding conductive strands of aluminum alloy or the like into a tubular shape, and is flexible. A female terminal 25 is fixed to a tip part of the core 14*a* exposed to outside. The female terminal 25 is arranged at a position to be electrically connected to the terminal 13*a* of the mating connector 13 inserted thereinto when the housing 21 is connected to the mating connector 13. A lower housing 26 to be fit to a part of the mating connector 13 while restricting the escape of the shielded cables 14 including the female terminals 25 by being engaged with the female terminals 25 is fixed to the lower opening in the body portion 21*a* of the housing 21.

Further, as shown in FIGS. 2 and 3, the connector 11 includes a shield terminal 27 provided between the pair of shielded cables 14 in the housing 21 and held in contact with the shield members 14*c* of the pair of shielded cables 14. The shield terminal 27 of the connector 11 is connected to the ground terminal 13*b* by connecting the housing 21 to the mating connector 13. In this way, the shield members 14*c* of the shielded cables 14 are made conductive to (grounded to) the casing 12 via the shield terminal 27 of the connector 11 and the ground terminal 13*b* of the mating connector 13.

Figure 6:
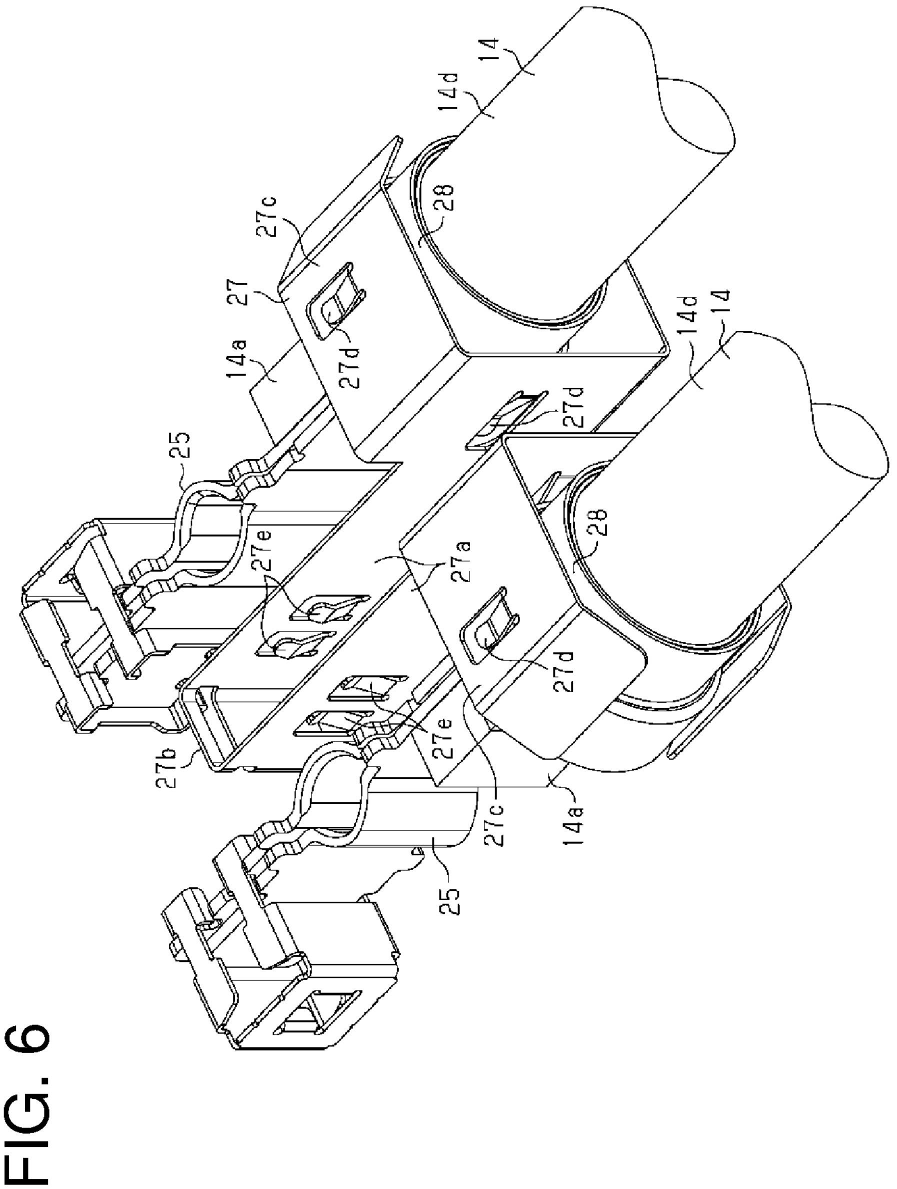
FIG. 6 is a partial perspective view of the connector in the one embodiment.

In particular, as shown in FIG. 6, the shield terminal 27 may be a single bent conductive plate member and includes, for example, a pair of parallel portions 27*a*, a coupling portion 27*b* coupling one ends of the pair of parallel portions 27*a* and connecting portions 27*c* provided on the other ends of the pair of parallel portions 27*a*. The connecting portions 27*c* are connected to the shield members 14*c* via tubular shield sleeves 28. That is, the connecting portion 27*c* is formed to surround the outer surface of the shield sleeve 28 and includes a contact piece 27*d* to be pressed into contact with the outer surface of the shield sleeve 28. As shown in FIG. 3, the shield member 14*c* is folded outwardly of the outer insulation coating 14*d* and connected to the inner surface of the shield sleeve 28. In this way, the connecting portion 27*c* is electrically connected to the shield member 14*c*.

The shield terminal 27 is configured such that the ground terminal 13*b* of the mating connector 13 is connected to the pair of parallel portions 27*a* while being inserted between the parallel portions 27*a* when the housing 21 is connected to the mating connector 13. As shown in FIG. 6, the pair of parallel portions 27*a* are provided with contact pieces 27*e* projecting toward each other, and the contact pieces 27*e* are pressed into contact with the ground terminal 13*b* when the housing 21 is connected to the mating connector 13. An interval between the parallel portions 27*a* of the shield terminal 27 is held by a holding member 29 interposed between the inner surface of the wire inserting portion 21*b* and the outer surfaces of the shielded cables 14.

The electromagnetic shielding shell 22 is set to electrically contact the casing 12 at three or more points.

In particular, as shown in FIGS. 3 to 5, the electromagnetic shielding shell 22 includes grounding projections 22*b* projecting to contact the casing 12. A pair of the grounding projections 22*b* are provided on both ends on a side corresponding to an end part of the wire inserting portion 21*b* where the shielded cables 14 are exposed to outside. The electromagnetic shielding shell 22 electrically contacts the casing 12 at three points by the pair of grounding projections 22*b* and a screw 30 (see FIGS. 1 and 4) threadably engaged with the casing 12 through a screw through hole 22*c* of the electromagnetic shielding shell 22. The screw through hole 22*c* is formed in a center on a side opposite to the pair of grounding projections 22*b*. A cap 31 is put on a head part of the screw 30.

Next, functions of the connector 11 configured as described above are described.

With the connector 11 fixed to the casing 12, the outer surface of the housing 21 is surrounded by the electromagnetic shielding shell 22 and the casing 12, which is a conductive member. Further, the shield members 14*c* of the shielded cables 14 are connected to the casing 12 via the shield sleeves 28, the shield terminal 27 and the ground terminal 13*b*. In this way, the radiation of electromagnetic waves from the connector 11 and the shielded cables 14 is suppressed.

Next, effects off the above embodiment are described below.

(1) Since the connector 11 includes the electromagnetic shielding shell 22 for covering the outer surface of the housing 21, the radiation of electromagnetic waves from the connector 11 can be suppressed. Further, since the connector 11 includes the shield terminal 27 to be connected to the shield members 14*c* of the shielded cables 14 and connected to the ground terminal 13*b* of the mating connector 13 by connecting the housing 21 to the mating connector 13, the shield members 14*c* can be easily connected to the ground terminal 13*b* to suppress the radiation of electromagnetic waves from the shielded cables 14. Such as due to the shield terminal 27 provided between the plurality shielded cables 14 in the housing 21, a configuration can be simplified and a size reduction can be realized, for example, as compared to a multi-layer structure in which a shield shell is arranged outside an inner housing and an outer housing is further arranged outside the shield shell as before.

(2) Since the electromagnetic shielding shell 22 is set to electrically contact the casing 12, which is a conductive member, at three or more points, the radiation of electromagnetic waves can be satisfactorily suppressed.

(3) Since the electromagnetic shielding shell 22 includes the grounding projections 22*b* projecting to contact the casing 12, which is a conductive member, the electromagnetic shielding shell 22 can be brought into contact with the casing 12 at an effective position while having a simple configuration. That is, the electromagnetic shielding shell 22 may be lifted due to component accuracy or the like and may not contact at the effective position even if an attempt is made to bring the electromagnetic shielding shell 22 into surface contact with the casing 12 in a wide range. However, by avoiding this, the electromagnetic shielding shell 22 can be brought into contact with the casing 12 at the effective position.

(4) The electromagnetic shielding shell 22 is set to electrically contact the casing 12 at least at three points by the pair of grounding projections 22*b* and the screw 30 threadably engaged with the casing 12 through the electromagnetic shielding shell 22. Thus, the electromagnetic shielding shell 22 can be stably fixed to the casing 12 by being electrically brought into contact with the casing 12 at three effective points while having a simple configuration.

(5) Since being made of the bent conductive plate material, the shield terminal 27 can be easily manufactured. Further, since the ground terminal 13*b* is connected to the parallel portions 27*a* while being inserted between the pair of parallel portions 27*a* when the housing 21 is connected to the mating connector 13, the shield terminal 27 and the ground terminal 13*b* can be connected with high reliability, for example, as compared to the case where the shield terminal 27 and the ground terminal 13*b* are connected only by a contact piece configured to contact in a single direction.

This embodiment can be modified and carried out as follows. This embodiment and the following modifications can be combined with each other and carried out without technically contradicting each other.

Although the electromagnetic shielding shell 22 is set to electrically contact the casing 12, which is a conductive member, at three or more points in the above embodiment, there is no limitation to this and the electromagnetic shielding shell 22 may contact the casing 12 at two or less points.

Although the electromagnetic shielding shell 22 includes the grounding projections 22*b* projecting to contact the casing 12, which is a conductive member, in the above embodiment, there is no limitation to this and the grounding projections 22*b* may not be provided. Further, the casing 12 may be provided with projection(s) projecting toward the electromagnetic shielding shell 22 and the electromagnetic shielding shell 22 and the case 12 may be brought into contact at an effective position.

Although the electromagnetic shielding shell 22 is configured to electrically contact the casing 12 by the pair of grounding projections 22*b* and the screw 30 threadably engaged with the casing 12 through the electromagnetic shielding shell 22 in the above embodiment, there is no limitation to this and the electromagnetic shielding shell 22 may be fixed, for example, by a configuration other than the screw 30. In such a case, the electromagnetic shielding shell 22 and the casing 12 may be brought into contact by another configuration.

Although the shield terminal 27 is configured such that the ground terminal 13*b* is connected to the parallel portions 27*a* while being inserted between the pair of parallel portions 27*a* when the housing 21 is connected to the mating connector 13 in the above embodiment, there is no limitation to this and the shield terminal 27 may be, for example, connected to the ground terminal 13*b* only by a contact piece configured to contact in a single direction.

The connector 11 of the embodiment may be called a wiring side connector. The mating connector 13 of the embodiment may be called a connector receiver. The mating connector 13, the terminals 13*a* and the ground terminal 13*b* of the embodiment may be called an electrical device side connector. A combination of the connector 11 and the mating connector 13 of the embodiment may be called a coupling structure. The body portion 21*a* of the housing 21 of the embodiment may be called a terminal accommodation chamber. The wire inserting portion 21*b* of the embodiment may be called a wire draw-out port configured to draw out the shielded cables 14 in a wire draw-out direction. As shown in FIG. 5, the lower housing 26 of the embodiment includes an opening, into which the terminals 13*a* and the ground terminal 13*b* of the mating connector 13 are inserted in the mounting direction, and this opening may be called a terminal port. The terminal port of the lower housing 26 is configured to enable the sliding contact of the terminals 13*a* and the female terminals 25 in the mounting direction and the sliding contact of the ground terminal 13*b* and the shield terminal 27 in the mounting direction. A combination of the housing 21 and the lower housing 26 of the embodiment may be called a wiring side connector housing.

The present disclosure includes the following implementation examples. Reference numerals of several constituent elements of illustrative embodiments are given not for limitation, but for understanding assistance. Matters described in the following implementation examples may be partly omitted or several of the matters described in the implementation examples may be selected or extracted and combined.

[Addendum 1] Several implementation examples of the present disclosure provide a coupling structure including an electrical device side connector (13, 13*a*, 13*b*) configured to be mounted on a metal casing (12) of an electrical device and a wiring side connector (11) configured to be mounted to the electrical device side connector (13, 13*a*, 13*b*) in a mounting direction and mechanically and electrically connected to the electrical device side connector (13, 13*a*, 13*b*), wherein:

the electrical device side connector (13, 13*a*, 13*b*) may include:

an insulating connector receiver (13) configured to be mechanically fixed to the metal casing (12);

a plurality of electrical device side first metal terminals (13*a*) supported in or integrated with the insulating connector receiver (13); and an electrical device side ground terminal (13*b*) supported in or integrated with the insulating connector receiver (13) and configured to be conductive to the metal casing (12), the wiring side connector (11) may include:

a plurality of shielded cables (14) each having a conductive core (14*a*), an insulation coating (14*b*) for concentrically covering the conductive core (14*a*) and a tubular shield member (14*c*) for concentrically covering the insulation coating (14*b*);

a plurality of wiring side first metal terminals (25) fixedly connected to the conductive cores (14*a*) of the plurality of shielded cables (14);

a wiring side ground terminal (27) electrically connected to the tubular shield members (14*c*) of the plurality of shielded cables (14);

a wire draw-out port (21*b*) configured to draw out a bundle of the plurality of shielded cables (14) in a wire draw-out direction intersecting or orthogonal to the mounting direction and a terminal accommodation chamber (21*a*) for accommodating the plurality of wiring side first metal terminals (25); and a wiring side connector housing (21, 26) having a terminal port open in the mounting direction to enable the sliding contact of the plurality of electrical device side first metal terminals (13*a*) and the plurality of wiring side first metal terminals (25) in the mounting direction and the sliding contact of the electrical device side ground terminal (13*b*) and the wiring side ground terminal (27) in the mounting direction, and the wiring side ground terminal (27) may be arranged between the plurality of shielded cables (14) arranged side by side on a virtual plane orthogonal to or intersecting the mounting direction in the wiring side connector housing (21, 26).

[Addendum 2] In several implementation examples, the plurality of wiring side first metal terminals (25) and the plurality of electrical device side first metal terminals (13*a*) may be aligned at a first position in the wire draw-out direction and electrically connected at the first position in the wiring side connector housing (21, 26), and the wiring side ground terminal (27) and the electrical device side ground terminal (13*b*) may be electrically connected at the first position in the wire draw-out direction in the wiring side connector housing (21, 26).

[Addendum 3] In several implementation examples, the wiring side ground terminal (27) may include a first leaf spring (27*e*) configured to contact the electrical device side ground terminal (13*b*) and resiliently press the electrical device side ground terminal (13*b*) in a direction orthogonal to or intersecting the mounting direction.

[Addendum 4] In several implementation examples, the plurality of shielded cables (14) can include shield sleeves (28) configured to respectively directly contact the tubular shield members (14*c*) of the plurality of shielded cables (14).

[Addendum 5] In several implementation examples, the shield sleeves (28) may be arranged at a second position different from the first position in the wire draw-out direction in the wiring side connector housing (21, 26).

[Addendum 6] In several implementation examples, the wiring side ground terminal (27) may include second leaf springs (27*d*) configured to contact the shield sleeves (28) at the second position and resiliently press the shield sleeves (28) in radial directions of the shielded cables (14) in the wiring side connector housing (21, 26).

[Addendum 7] In several implementation examples, the electrical device side ground terminal (13*b*) may include a leaf spring (13*d*) configured to contact the metal casing (12) and resiliently press the metal casing (12).

[Addendum 8] In several implementation examples, the electrical device side ground terminal (13*b*) may be arranged between the plurality of electrical device side first metal terminals (13*a*) in the insulating connector receiver (13).

[Addendum 9] In several implementation examples, the wiring side connector (11) may be provided on one end part of a vehicle wiring harness.

LIST OF REFERENCE NUMERALS

N screw
11 connector
12 casing constituting part of mating member
12*a* fixing hole
13 mating connector constituting part of mating member
13*a* terminal
13*b* ground terminal
13*c* support column
13*d* grounding piece
14 shielded cable
14*a* core
14*b* inner insulation coating
14*c* shield member
14*d* outer insulation coating
21 housing
21*a* body portion
21*b* wire inserting portion
21*c* locking claw
22 electromagnetic shielding shell
22*a* locking hole
22*b* grounding projection
22*c* screw through hole
23 rubber seal
24 retainer
25 female terminal
26 lower housing
27 shield terminal
27*a* parallel portion
27*b* coupling portion
27*c* connecting portion
27*d* contact piece
27*e* contact piece
28 shield sleeve
29 holding member
30 screw
31 cap

What is claimed is:

1. A coupling structure, comprising:

a connector; and a mating connector fixed to a conductive casing, wherein:

the connector includes a plurality of shielded cables each having a conductive core and a conductive shield member, a housing made of resin, the plurality of shielded cables being held in the housing while being partially inserted, a shield terminal provided between the plurality of shielded cables in the housing and connected to the shield members of the plurality of shielded cables, and an electromagnetic shielding shell for covering an outer surface of the housing, the mating connector includes a ground terminal to be conductive to the conductive casing and a plurality of non-ground terminals, the cores of the plurality of shielded cables of the connector are respectively connected to the plurality of non-ground terminals of the mating connector and the shield terminal of the connector is connected to the ground terminal of the mating connector when the housing of the connector is connected to the mating connector, the electromagnetic shielding shell of the connector is configured to directly contact and be conductive to an outer surface of the conductive casing when the housing of the connector is connected to the mating connector, and the shield terminal of the connector and the ground terminal of the mating connector are configured to cause the shield members of the plurality of shielded cables to be conductive to a non-outer surface of the conductive casing different from the outer surface when the housing of the connector is connected to the mating connector.

2. The coupling structure according to claim 1, wherein the electromagnetic shielding shell is set to electrically contact the conductive casing at three or more points.

3. The coupling structure according to claim 2, wherein the electromagnetic shielding shell includes a grounding projection projecting to contact the conductive casing.

4. The coupling structure according to claim 3, wherein the electromagnetic shielding shell is set to electrically contact the conductive casing at least at three points by a pair of the grounding projections and a screw threadably engaged with the conductive casing through the electromagnetic shielding shell.

5. The coupling structure according to any one of claims 1 to 4, wherein the shield terminal is made of a bent conductive plate material and includes a pair of parallel portions, a coupling portion coupling one ends of the pair of parallel portions and connecting portions respectively provided on the other ends of the pair of parallel portions to be connected to the shield members, and the ground terminal is inserted between the pair of parallel portions and connected to the pair of parallel portions when the housing is connected to the mating member.

* * * * *